US006687235B1

(12) United States Patent
Chu

(10) Patent No.: US 6,687,235 B1
(45) Date of Patent: Feb. 3, 2004

(54) MITIGATION OF NON-LINEAR SIGNAL PERTURBATIONS USING TRUNCATED VOLTERRA-BASED NON-LINEAR ECHO CANCELER

(75) Inventor: Fred Chu, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/489,099

(22) Filed: Jan. 21, 2000

(51) Int. Cl.[7] .................................................. H04B 3/23
(52) U.S. Cl. .................................. 370/286; 379/406.01
(58) Field of Search .............................. 370/286–292; 379/406.01–406.14

(56) References Cited

U.S. PATENT DOCUMENTS

| 3,647,992 A | * | 3/1972 | Thomas .................. 379/406.08 |
| 4,669,116 A | | 5/1987 | Agazzi et al. ............... 379/411 |
| 4,977,591 A | | 12/1990 | Chen et al. .................. 379/410 |
| 5,148,427 A | | 9/1992 | Buttle et al. ................ 370/32.1 |
| 5,329,586 A | | 7/1994 | Agazzi ........................ 379/406 |
| 5,500,892 A | * | 3/1996 | Essig .......................... 379/345 |
| 5,627,885 A | * | 5/1997 | Paneth et al. ............. 379/93.28 |
| 5,778,055 A | * | 7/1998 | Paneth et al. ............ 379/93.31 |
| 6,516,063 B1 | * | 2/2003 | Farrell et al. .......... 379/406.08 |

* cited by examiner

*Primary Examiner*—Min Jung
(74) *Attorney, Agent, or Firm*—Allen, Dyer, Doppelt, Milbrath & Gilchrist, P.A.

(57) ABSTRACT

A non-linear echo cancellation scheme for a digital transceiver coupled to a wireline medium effectively mitigates against non-linear line perturbations that may cause disruption of digital communication services. A first embodiment employs a fast, linear echo canceler, and a truncated non-linear Volterra canceler coupled to an error cancellation location in the data signal flow path downstream of the data pump's linear equalizer. A second embodiment employs only a nonlinear Volterra echo canceler, the output of which is coupled to an error cancellation location in the data signal flow path upstream of the data pump's linear equalizer. A third embodiment employs a linear echo canceler with high gain setting on selected taps, and a truncated non-linear Volterra canceler coupled to an error cancellation location in the data signal flow path downstream of the data pump's linear equalizer.

24 Claims, 14 Drawing Sheets

TABLE 1

| 2ND ORDER SIZE (NxN) | # OF TAPS (N+1)N/2 | AVG SNR (dB) | DISTRIBUTION ADJ (dB) |
|---|---|---|---|
| 4x4 | 10 | 32 | -5.0 |
| 5x5 | 15 | 32 | -4.8 |
| 6x6 | 21 | 33 | -3.0 |
| 7x7 | 28 | 34.4 | -2.5 |
| 8x8 | 36 | 36.2 | -2.0 |
| 9x9 | 45 | 37.6 | -1.0 |
| 10x10 | 55 | 37.9 | 0 |

TABLE2

| NONLINEAR MODEL | AVG SNR (dB) |
|---|---|
| CASE I | 32.5 |
| CASE II | 34.5 |
| CASE III | 36.5 |
| CASE IV | 37.2 |
| CASE V | 37.6 |

TABLE3

| NONLINEAR MODEL | AVG SNR (dB) |
|---|---|
| CASE I | 33.4 |
| CASE II | 35.5 |
| CASE III | 37.7 |
| CASE IV | 38.4 |
| CASE V | 39.1 |

MITIGATION OF NON-LINEAR SIGNAL PERTURBATIONS USING TRUNCATED VOLTERRA-BASED NON-LINEAR ECHO CANCELER

FIELD OF THE INVENTION

The present invention relates in general to communication systems, and is particularly directed to a new and improved echo cancellation mechanism for use within a digital communications transceiver coupled to a two-wire loop, and which serves to effectively mitigate against non-linear signal perturbations that may cause disruption of digital communication services, such as, but not limited to, those caused by micro-interruptions, in the two-wire loop providing high bit-rate digital subscriber line (HDSL) service, digital data service (DDS), integrated services digital network (ISDN) service, or HDSL2 service, that are transportable by transceivers over the two-wire loop.

BACKGROUND OF THE INVENTION

In a typical telecommunication network for providing full-duplex data communications there is a first transceiver at a central office coupled via a two wire loop to a second transceiver at a second location. The first transceiver is usually referred to as an upstream transceiver and the second transceiver is referred to as a downstream transceiver. A signal transmitted from the first transceiver to the second transceiver travels in the downstream direction and conversely a signal transmitted towards the first transceiver travels in the upstream direction. Each of the transceivers has a transmitter and receiver. There are several methods to separate the upstream and downstream signals when the signals arrive at their respective receivers. The methods include time division multiplexing and frequency division multiplexing.

However when neither of the above multiplexing methods is used and when there is a significant frequency overlap of the downstream and upstream signals, echo canceling methods may be used. Echo cancellation methods have been in use since the early 1960s (e.g., attention may be directed to M. M. Sondhi, "An Adaptive Echo Canceller," Bell System Technical Journal, Vol. 48, No.3, March 1967, pp. 497–511, and F. K. Becker et al, "Application of Automatic Transversal Filters to the Problem of Echo Suppression," Bell Technical Journal, Vol. 45, No. 12, March 1966, pp. 1847+) and are also discussed in books such as "The Communications Handbook," edited by Jerry D. Gibson, CRC Press, 1997. Typically, echo cancelers are linear echo cancelers and in the present application linear echo cancelers are also referred to as conventional cancelers. Echos are also partially cancelled by a hybrid circuit contained in line interface circuits. Hybrid circuits have a variety of component arrangements but are well known to those skilled in the art of telecommunications transceiver design.

In recent years, the demands for an increase in transmission speed of full duplex communications over a two wire loop have placed greater demands on the technology associated with the transceivers providing the service. New modulations methods have been developed, such as described in U.S. Pat. No. 5,809,033 to M. Turner et al, issued Sep. 15, 1998, entitled: "Use of Modified Line Encoding and Low Signal-to Noise Ratio Based Signal Processing to Extend Range of Digital Data Transmission Over Repeaterless Two-Wire Telephone Link: (hereinafter referred to as the '033 patent) assigned to the assignee of the present application and the disclosure of which is herein incorporated.

In order to approach maximum channel capacity, the highest data rate possible on a two wire loop, it is necessary to limit the transmission degradation caused by channel impairments. Micro-interruptions, one such channel impairment, can cause performance degradation and in some cases cause loss of a transmission signal (LOS). Micro-interruptions may be caused by faulty splices, degradation of protective circuits, bad connects to equipment, and other faults. Micro-interruptions are defined as "a temporary interruption" in the Draft Standard for HDSL2, T1E1.4/99-006R6, Dec. 6–10, 1999. The inventor has discovered, by computer analysis of field data that micro-interruptions generate echoes with nonlinear components. The nonlinear components, when having the magnitudes as observed from field data, cannot be cancelled by a combination of conventional echo cancelers and hybrid circuits.

Micro-interruptions may occur, for example, where a passing railroad locomotive generates vibrations in the vicinity of a manhole containing a faulty splice, either the splice itself or protection circuitry may act as a diode, and introduce excessive second order harmonics in the line. Analysis by the present inventors has revealed that a faulty splice, when subjected to ambient vibration, may temporarily change the impedance of the line, albeit only slightly (e.g., as low as three ohms). Although there is no significant change in the insertion loss of the loop, if the impedance change is very sudden (or effectively instantaneous), it can cause the transceiver's hybrid circuit to deviate from its original response, disrupting service.

Because the full-duplex operation of the extended distance communication scheme described in the '033 patent relies on a high level of echo cancellation, then should the impulse response of the echo path change suddenly, this high-level of echo cancellation can be lost. As a consequence, signal quality drops significantly, which, in turn, causes cyclic redundancy check (CRC) errors and finally a loss of signal (LOS).

One potential solution to the faulty splice problem would be to improve the loop environment, for example, by having an installer check and repair all of the splices near the remote terminal unit. This is obviously a tedious procedure, and it solves the problem for only a single line. A pulsing current could also be used to neutralize the bad splices. However, this would improve the loop condition only temporarily.

SUMMARY OF THE INVENTION

In accordance with the present invention, the above-described micro-interruption problem is effectively mitigated by means of a new and improved non-linear echo canceler architecture, that is able to rapidly re-adapt to the new impulse response of the effective echo path. Pursuant to a first embodiment, the invention employs both a fast, linear echo canceler, and a truncated non-linear Volterra canceler coupled to an error cancellation location in the data signal flow path downstream of the data pump's linear equalizer. While the fast echo canceler provides superior tracking capability to combat time-varying loop impedance, the non-linear Volterra echo canceler is used to provide as much performance margin as possible, and thereby provide a very reliable link over a loop that may contain one or more micro-interruptions. The probability density function and the power spectral density of the residual noise reveal that a transceiver incorporating the first embodiment architecture does not have an asymmetrical noise distribution. As a result, the bit error rate can be predicted using Gaussian assumption analysis, and it is unnecessary to use a correction factor to adjust the margin.

Pursuant to a second embodiment, the invention employs only the nonlinear Volterra echo canceler, the output of which is coupled to an error cancellation location in the data signal flow path upstream of the data pump's linear equalizer. In addition, the data pump's conventional echo canceler has an increased steady-state gain for selected taps to track variations in the echo path. The advantage of using this second architecture is its reduced complexity, and the required number of taps for the nonlinear canceler is smaller. Its echo tracking performance is less than that of the first embodiment.

In a third embodiment, a high-gain echo canceler is coupled upstream of the linear equalizer, and a non-linear echo canceler is coupled downstream of the linear equalizer and between the modulo device and the decoder. The architecture of the third embodiment enjoys the benefits of the second embodiment, including similar performance, plus the additional benefits of fast tracking and low complexity.

BRIEF DESCRIPTION OF THE DRAWINGS

FIG. 13 shows the performance of the echo canceler architecture of FIG. 12, with only the linear, fast echo canceler turned on;

FIG. 14 shows the performance of the echo canceler of FIG. 12 with both the fast echo canceler and the non-linear Volterra echo canceler turned on;

DETAILED DESCRIPTION

Figure 1:
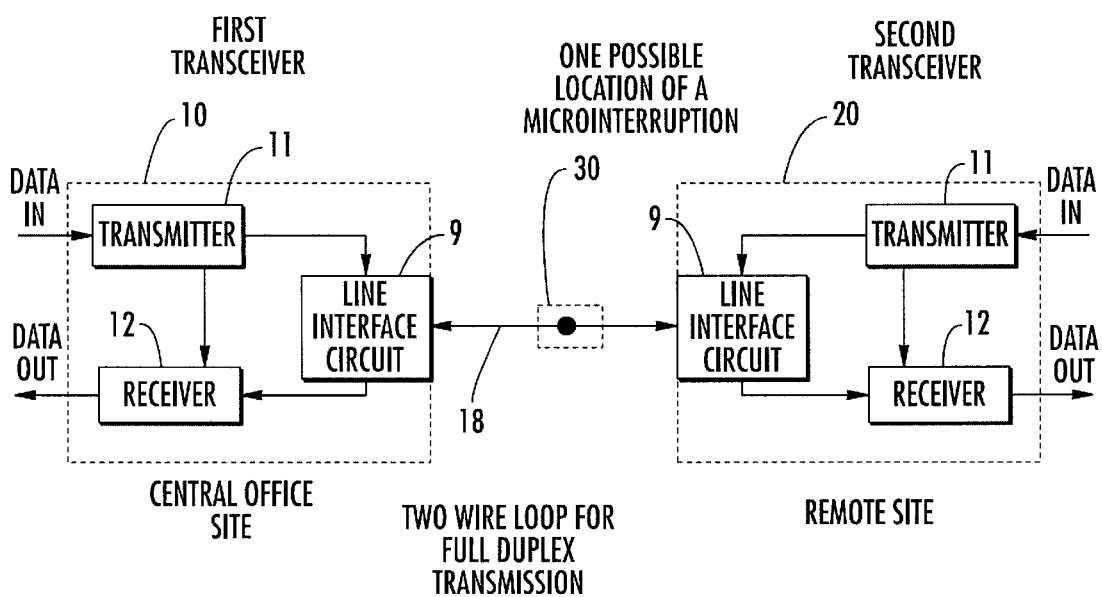
FIG. 1 diagrammatically illustrates two transceivers coupled by a two-wire loop.

Before describing the details of the functionality and architecture of the truncated Volterra-based non-linear echo canceler of the invention, it should be observed that the present invention resides primarily in what is effectively a modular arrangement of conventional telecommunication signaling hardware components and attendant supervisory communications microprocessor circuitry and application software therefor, that controls the operations of such components. In a practical implementation that facilitates their incorporation into telecommunication equipment, these modular arrangements may be readily implemented as field programmable gate array (FPGA) and/or application specific integrated circuits (ASICs).

Consequently, the configuration of such components and the manner in which they are interfaced with communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood. In terms of a practical hardware implementation, digital ASICs are preferred.

The data communication arrangement of FIG. 1 illustrates a first transceiver 10 coupled to a second transceiver 20 via a two wire loop 18. In a typical arrangement the first transceiver is located at a central office (CO) site and the second transceiver is located at a remote site. The remote location may be within a service providers network or may be customer premise equipment. Further the second transceiver may be a portion of a repeater or may be an interface with data terminal equipment. Each of the transceivers has a transmitter 11, a receiver 12, and a line coupling circuit 9. The line coupling circuit provides for impedance matching and for separation of transmit and receiver signals. The line coupling circuit is often referred to as a hybrid circuit. The two wire loop 18 coupling the transceivers may be comprised of several sections of wire pairs.

When the two-wire loop has more than one section between transceivers splices are required. When one of the splices is defective—a faulty splice—and is located in an environment that is subjected to vibrations, temperature changes and other undesirable disturbances, then the faulty splice may cause micro-interruptions 30. Other sources of micro-interruptions may be caused by faulty surge protectors, imperfect connections, and other flaws in the two-wire loop. Because micro-interruptions may occur in a variety of communication channels, the present invention is not limited to only two-wire loops, which are described as a non-limiting example of a communication environment in which the invention may be employed.

Figure 2:
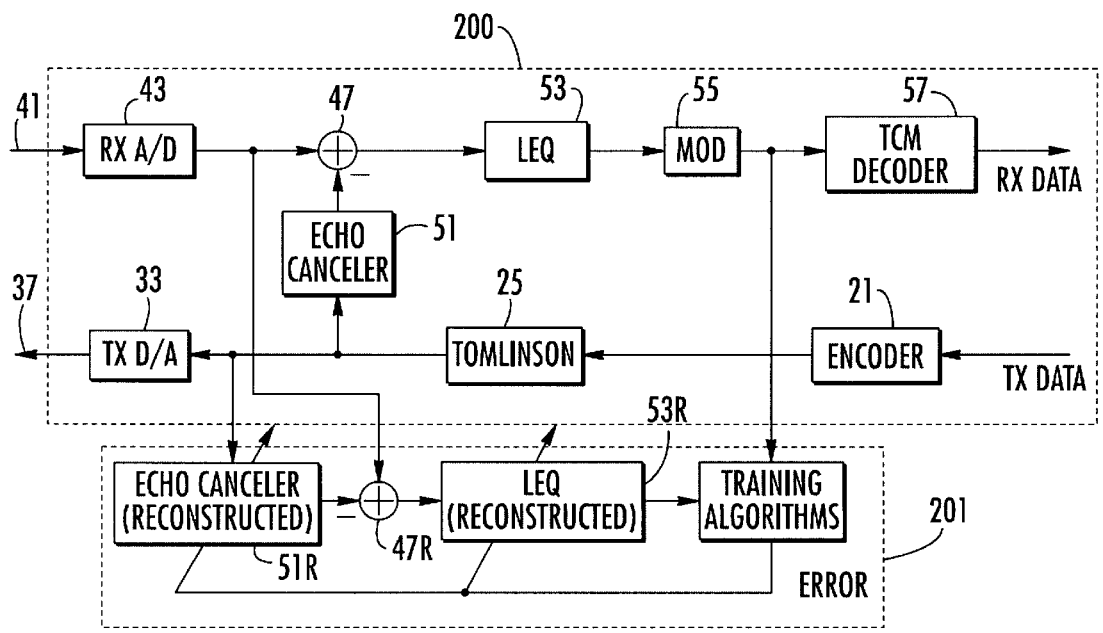
FIG. 2 diagrammatically illustrates the data pump portion of one of the transceivers of FIG. 1 with diagnostic circuits.

Moreover, the architecture of the transceiver described in the '033 will used for purposes of providing a non-limiting example of a transceiver architecture in which the present invention may be employed. FIG. 2 shows a data pump 200 with equivalent elements and the architecture of the '033 patent and uses the same reference numerals employed therein. In addition, FIG. 2 shows a block 201 that represents a diagnostics program or reconstruction program used to replicate the field data for determining the response of transceiver elements.

In order to appreciate the echo cancellation functionality of the mechanism of the present invention, it is initially useful to examine the properties of the environment in which the transceiver may be installed, as these properties are potential sources of the above-referenced 'micro-interruption' problem, and what characteristics should be possessed by the transceiver's cancellation mechanism to mitigate against such noise sources.

As pointed out above, it has been observed that the echo path through the wireline signalling link may be subject to micro-interruptions, having time-dependent non-linear perturbations. For a worst case scenario, in which the line impedance changes effectively instantly, it would be necessary to employ a recursive least square (RLS) algorithm (which has excellent convergence speed) in an additional fast echo canceler. A drawback to this approach is the substantial increase in signal processing complexity that would have to be made to the echo canceler. However, if the impedance change has a reasonable time constant (rise-time or fall-time), it may be possible to employ a less complex echo cancellation scheme, such as a conventional least mean square (LMS) or other modified version of an LMS algorithm. To make this determination, it is necessary to compare the tracking speed of the transceiver's digital echo canceler with the speed of the actual line impedance variation.

Because it can be expected that there are other noise sources (in addition to impedance variation) that contribute to service disruption, noise measurements were conducted on a transceiver of the type described in the above-referenced '033 patent. These measurements produced a plurality of data sets, including those associated with central office receiver measurements and those associated with remote terminal measurements. The data sets contained multiple seconds (e.g. on the order of at least one million bauds) of signal points along a data path through the data pump of a transceiver of the type described in the '033 patent and shown in FIG. 2.

The signal locations of the measured data points are as follows: 1—the input to the transmitter's digital-to-analog converter (DAC) 33; 2—the output of the receiver's analog-to-digital converter (ADC) 43; 3—the output of the linear equalizer (LEQ) 53 upstream of the modulo device 55; 4—the decoded data symbol produced by a (trellis coded modulation) decoder 57; and 5—the sample timing generated by a timing recovery unit (corresponding to timing recovery unit 45 of the '033 patent, relative to the analyzer.

In order to ostensibly identify the noise sources (e.g., impedance variation, impulse noise, nonlinear distortion, etc.) that may contribute to service disruption on the line, the condition of the data pump portion of the transceiver of FIG. 2 was reconstructed for each of normal operation, CRC errors, and loss of synchronization. Data pump condition reconstruction was derived by post-processing the signal traces extracted from the digital logic analyzer. The post-processing program performed correlation between the input to the transmitter's DAC 33 and the output of the receiver's ADC 43, in order to approximate the echo canceler taps employed in an actually installed transceiver. It also executed a generalized correlation between the output of the receiver's LEQ 53 with the output of the ADC 43, so as to extract the LEQ taps, while the echo canceler taps were trained jointly.

The test analysis revealed that within a data interval of less than 100 kbauds, it is possible to drive the difference between the reconstructed output of the LEQ 53 and the recorded LEQ output below −55 dB (with the signal normalized to 0 dB), namely an average measurement noise of −55 dB. For a target signal-to-noise ratio of the transceiver on the order of 30 to 40 dB, as a non-limiting example, the measurement noise is at least 15 dB down. Given the coefficients of the taps of the LEQ 53 and the taps of the echo canceler 51, the residual noise out of the trellis decoder 57 was measured. The statistics and the time-dependency of this residual noise measurement provide both an indication of the cause the micro-interruption problem and how to mitigate against it.

Figure 3:
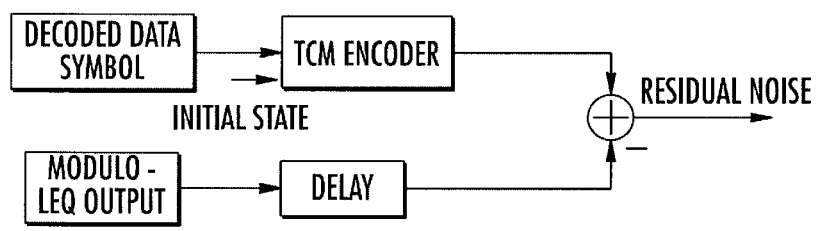
FIG. 3 diagrammatically illustrates functional components of a computer simulation for determining residual noise in one of the transceivers of FIG. 1.

A computer simulation was used to recreate the residual noise from the data extracted by the reconstruction program. The computer simulation used commercially available Angeles software. The manner in which the residual noise was determined is shown diagrammatically in FIG. 3. The delay is associated with the trace-back depth of the trellis coded modulation (TCM) encoder. Since there are multiple possible initial states for the encoder, and the symbol error event is very rare, the initial state of the TCM encoder was determined by trial and error. Once the initial state has been set, the residual noise is usually very small. The sources of this residual noise include the following: 1—residual echo, 2—residual intersymbol interference (ISI); and 3—other non-cancelable noise (e.g., quantization, thermal, and crosstalk).

Figure 4:
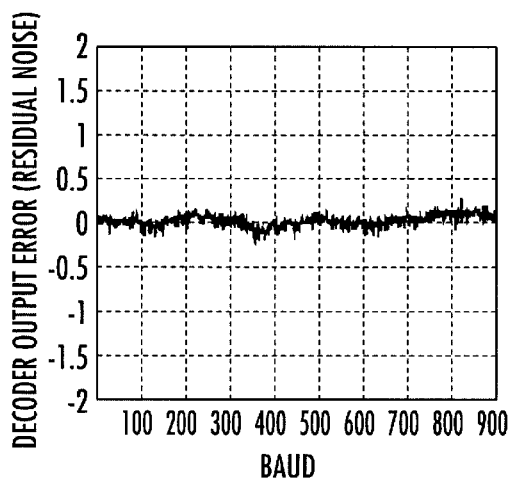
FIG. 4 shows a residual noise sequence extracted by the computer simulation of FIG. 3 when the line has no non-linear signal perturbation.

FIG. 4 shows a 'BEFORE' trace of the residual noise prior to CRC error and a LOS event. The signal constellation employed by the TCM decoder 57 is comprised of the values (−15, −13, −11, −9, ..., 9, 11, 13, 15), so that the signal noise ratio is on the order of 41.8 dB. Using the example of an eight-state TCM-coded 16 pulse amplitude modulation (PAM) transceiver, and assuming a realizable coding gain of 3 dB, the required SNR is on the order of 24.7 dB, which leaves approximately 17 dB of margin on the loop. This margin is based on an additive white Gaussian noise and a bit error rate (BER) of $10^{-7}$. Although a 17 dB margin should ideally ensure error free operation for more than a million years, in actual practice, the echo path through the wireline signaling link may be subject to significant time-dependent variation and non-linear perturbations, as noted above.

Figure 5:
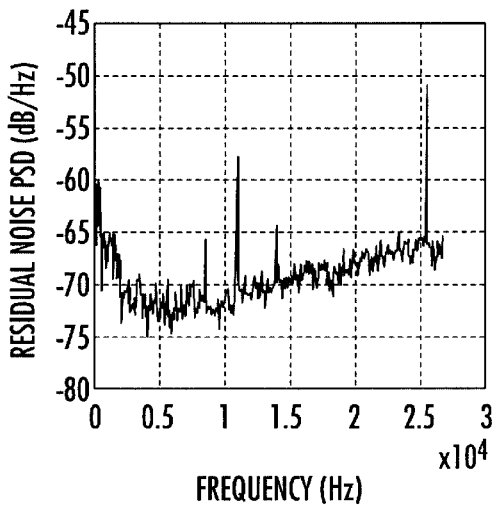
FIG. 5 shows the power spectral density of residual noise estimated from the computer simulation of FIG. 3.
Figure 6:
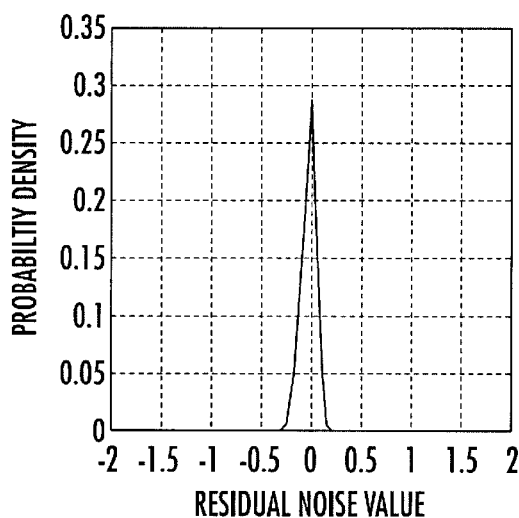
FIG. 6 shows a histogram of the residual noise of FIGS. 4 and 5.

To refine the noise analysis, the spectral and statistical properties of the residual noise were analyzed. First, the power spectral density (PSD) of the residual noise was estimated by the Welch method (overlap-and-add fast Fourier transform (FFT) method). As shown in FIG. 5, the residual noise is not only not white, but has a significant D.C. component, plus readily identifiable spurs at 11.1 kHz and 25.4 kHz. This implies that the wireline may suffer from a conductive electromagnetic interference (EMI) problem, which could be caused by a nearby switching power supply, for example. The relatively high D.C. component means that the D.C. taps 52 may not have sufficient attenuation. These are possible signs of the potential problem without the benefit of 17 dB of margin. A histogram of the residual noise, shown in FIG. 6, reveals that the noise is almost symmetrical with respect to zero. This is a desirable characteristic for error distribution, and implies that it there is an equal likelihood of a positive error and a negative error. The significance of this symmetrical distribution will be discussed below.

Figure 8:
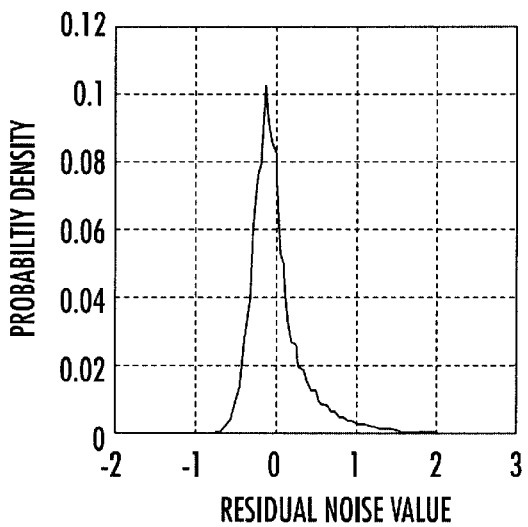
FIG. 8 is a histogram of the probability density function of an asymmetrical noise distribution of the residual noise characteristic of FIG. 7.
Figure 7:
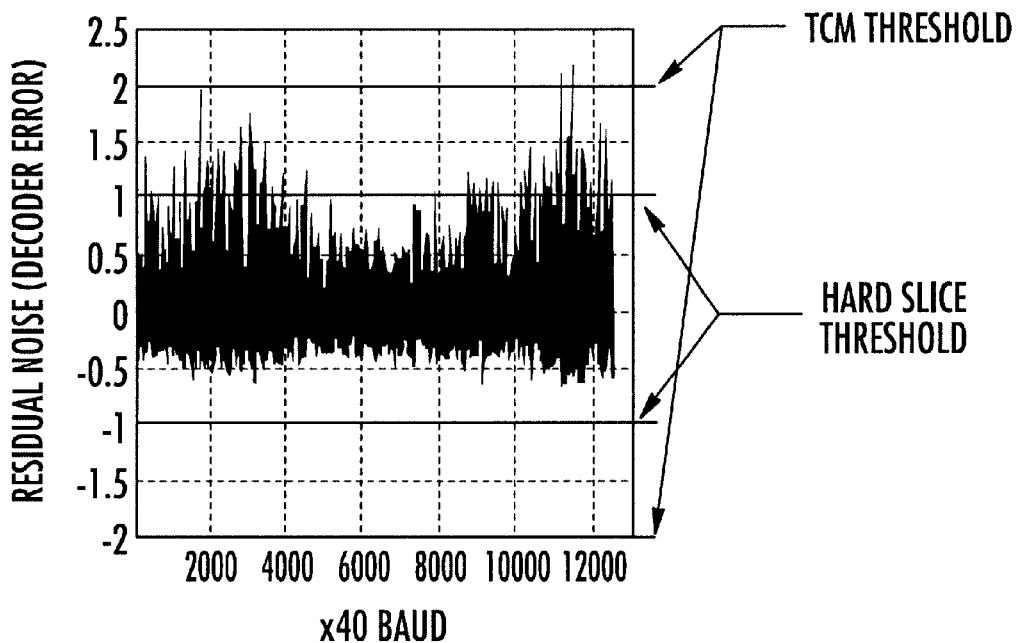
FIG. 7 shows a time-varying, residual noise sequence extracted by the computer simulation of FIG. 3, when the data pump makes CRC errors.

In addition to analyzing normal operation of the data pump on the test loop, a signal set associated with a condition that gives rise to CRC errors was analyzed. As shown in FIG. 7, there are two distinct features that are very different from the BEFORE trace shown in FIG. 4. First, the CRC residual noise is time-varying, which implies that the transceiver's adaptive filters are unable to track at least one form of noise for the environment in which the transceiver may be employed. A second distinct feature of this residual noise is that it has an asymmetrical distribution; namely, when errors occurred, they were one-sided, e.g., only the positive side of the noise exceeded the decision threshold. An asymmetrical noise distribution can cause more errors than a normal symmetrical noise distribution. The probability density function (PDF) of such a noise distribution is plotted in the histogram of FIG. 8.

As shown therein, the PDF resembles a classic Rayleigh distribution with zero mean. Since the square of two independent Gaussian noise sources is necessary to generate a random signal having a Rayleigh distribution, it is very likely that this noise has a significant second order (nonlinear) component. This second order noise source could be generated by the diode effect of a splice, or it could be that the uncanceled echo has too large a D.C. component, which causes the transformer to behave nonlinearly. Fortunately, (computer) simulations have demonstrated that such nonlinear noise can be effectively canceled using a relatively simple digital signal processor (DSP) algorithm, such as a simple second order Volterra model employing an LMS update, as will be described.

Figure 9:
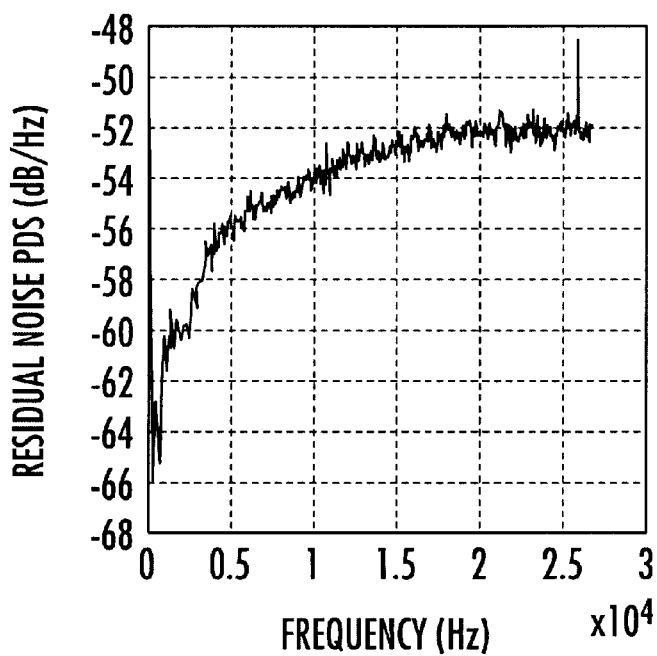
FIG. 9 shows the power spectral density of residual noise estimated from the computer simulation of FIG. 3.

The power spectral density (PSD) of the residual noise is shown in FIG. 9. In comparison with that of FIG. 5, the root mean squared (rms) noise power is higher up by more than 15 dB, so that the 17 dB of margin is severely reduced—to only 2 dB. The distribution of this noise also changes the meaning of the rms noise versus the actual bit error performance. Without detailing the mapping of the signal-to-noise ratio (SNR) to BER, the noise peak-to-rms ratio can be used to estimate penalty caused by this Rayleigh-like noise.

For 100,000 sample points, the sampled peak-to-rms ratio of a Gaussian process is on the order of 4, and the sampled peak-to-rms ratio of this Rayleigh-like noise is on the order of 7. Therefore, a penalty of another 20 log(7/4)=5 dB due to the distribution is likely to be incurred. After calibration, the effective SNR decreases to 21.8 dB. Thus, it is apparent that the receiver will make errors even when powerful forward error correction (FEC) protection is used. FIG. 9 also shows that the sinusoidal tones are still present on the line.

Figure 10:
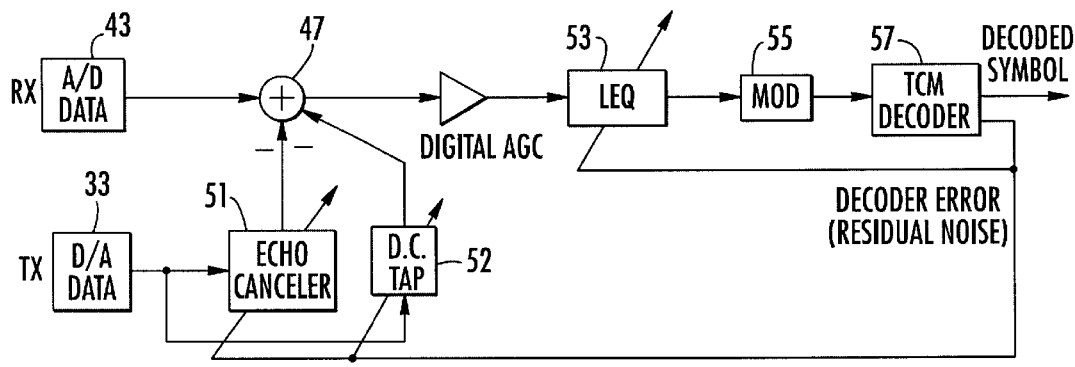
FIG. 10 is a block diagram of the transceiver of FIG. 2 used in a computer simulation.

In addition to the above diagnostic analysis, further computer simulations were used to model the operation of the transceiver, for the purpose of deriving a solution for the line's micro-interruption problem. The block diagram of FIG. 10 shows a replica of the transceiver of FIG. 1 used in the computer simulation. The coefficients for the echo canceler 51/47 and the linear equalizer 53 are preloaded from the previously run program. These additional simulations serve to approximate transceiver performance by varying the gain setting of the echo canceler 47/51 and the LEQ 53. By setting the echo canceler and the LEQ adaptation gain of $2^{-16}$, the computer simulation produced decoded symbols and decoder errors that closely match those generated by an actual transceiver. It was observed that the same nonlinear and non-stationary residual noise was obtained from the computer replica simulation, which indicates that the transceiver performs well under its specification.

Figure 11:
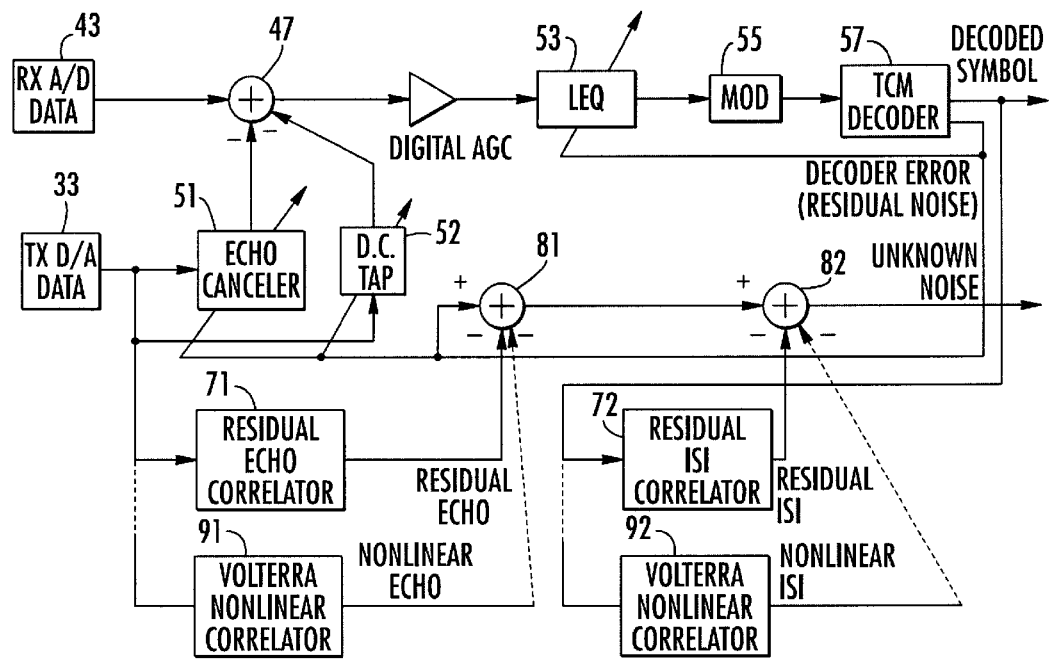
FIG. 11 shows the use of a pair of linear correlators to extract residual echo and residual intersymbol interference (ISI) out of the residual noise composite in the transceiver of FIG. 1.

The next step is to separate the residual noise into its three basic components: 1—residual ISI, 2—residual echo, and 3—unknown (uncancelable) noise such as, crosstalk, thermal, impulse and nonlinear noise ... etc. As shown in FIG. 11, two linear correlators 71, 72 were used to extract (via associated subtraction units 81, 82) the residual echo and the residual ISI, respectively, out of the residual noise composite. Both the residual echo correlator 71 and the residual ISI correlator 72 have a programmable delay input, 200 taps, and double precision floating point arithmetic. After adjusting the gain setting for these two correlators, it was determined that the composite noise has a very small contribution from residual ISI, but a significant one from residual echo, and unknown (uncancelable) noise. The residual echo component shows the time-varying feature. The uncancelable noise component has a one-sided distribution after residual ISI and residual echo are removed.

Also shown with broken line connections in FIG. 11 are Volterra nonlinear correlators 91, 92 in addition to the linear correlators 71, 72. Each Volterra nonlinear correlator has programmable input delay and a 100 taps×100 taps second order coefficient array. (The implementation of the nonlinear correlator requires only half of the number of taps due to the repetition of the coefficients.) As noted earlier, the coefficients of a Volterra canceler may be readily updated using a simple LMS algorithm. Because this signal processing scheme is intended to decompose the noise, the number of taps is excessively large. The results show that the nonlinear ISI is insignificant, while the nonlinear echo component represents a huge chunk of the originally unknown noise component. From this analysis, it can be seen that the residual noise composite is formed of the following components: 1) linear residual echo +2) nonlinear residual echo +3) linear residual ISI +4) nonlinear residual ISI +5) unknown noise. The linear residual ISI and nonlinear residual ISI are insignificant compared with linear residual echo and nonlinear residual echo. (There is not much that can be done about the fifth noise component until more information about 'unknown' noise is available.)

The composition of the residual noise reveals that a digital processing algorithm can be employed to effectively reduce the noise by removing the linear residual echo and the nonlinear residual echo. In order to determine how to accomplish this task using minimal resources (complexity), it is necessary to determine how fast is the change in the echo path and how wide (the number of taps) is the change. In accordance with the present invention, this task may be accomplished by using one of the respective echo cancellation architectures shown in FIGS. 12, 15 and 30.

Figure 12:
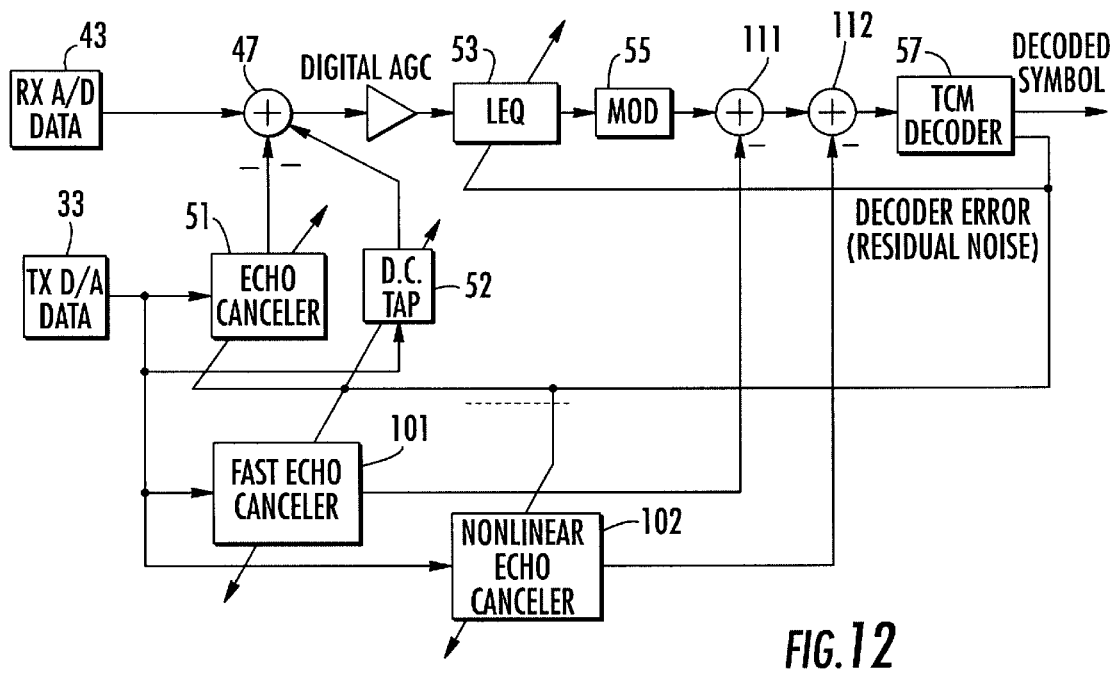
FIG. 12 shows a first embodiment of an echo cancellation architecture of the present invention containing both a linear fast echo canceler and a non-linear Volterra echo canceler.

The first, diagrammatically illustrated in FIG. 12, requires two additional components. A fast echo canceler 101, which is a conventional echo canceler, the output of which is coupled to a subtraction unit ill installed in the data signal flow path downstream of the LEQ 53, which can be RLS-adapted, or which can be simply LMS-adapted with a higher gain. The choice of the adaptation algorithm depends on the speed of the variation in line impedance. As a non-limiting example, the length of the linear echo canceler 101 may be on the order of fifteen taps. A nonlinear (Volterra) echo canceler 102, the output of which is coupled to a subtraction unit 112 installed in the signal flow path downstream of the LEQ 53, may employ a 10 taps×10 taps coefficient array. A practical realization using a truncated Volterra echo canceler, to be described with reference to FIGS. 21–29, requires only half this array size (or 50 taps).

Figure 13:
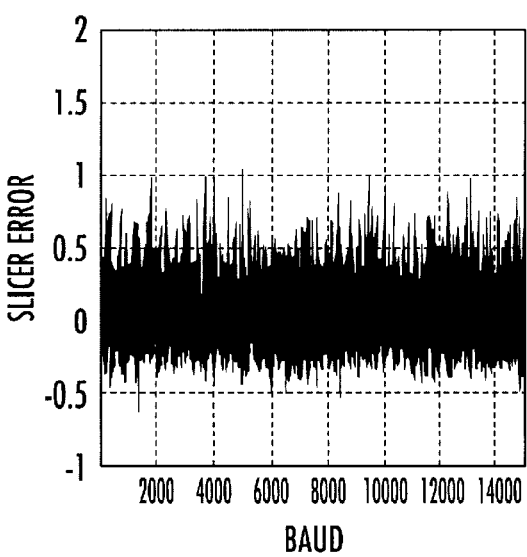
Figure 14:
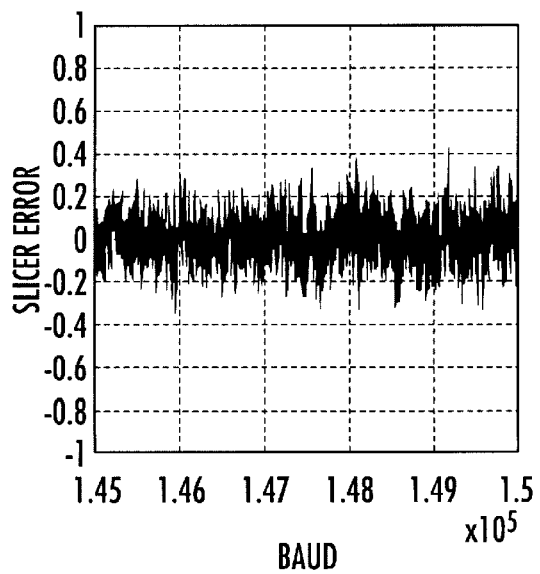

FIG. 13 shows the performance of the architecture of FIG. 12, in which only the linear, fast echo canceler 101 is activated or turned on, while FIG. 14 shows the echo canceler's performance with both the fast echo canceler 101 and the nonlinear echo canceler 102 turned on. These two curves were simulated under the CRC trace condition of FIG. 7. The other anomaly condition traces, such as CRC2 and LOS trace, were also simulated with similar results. These two performance curves illustrate a tradeoff between complexity and performance.

As shown in FIG. 13, the fast echo canceler 101 alone is able to prevent the TCM decoder 57 from making errors. However, as shown in FIG. 14, to provide as much margin as possible, the nonlinear echo canceler 102 is required. The signal noise ratio increases from 26.8 dB (or 21.8 dB effective) to 38.8 dB. Although there is still a loss of about 3 dB compared with the BEFORE trace, the performance margin improves to 14 dB, which implies a very reliable link, even in a loop containing one or more faulty splices.

Figure 15:
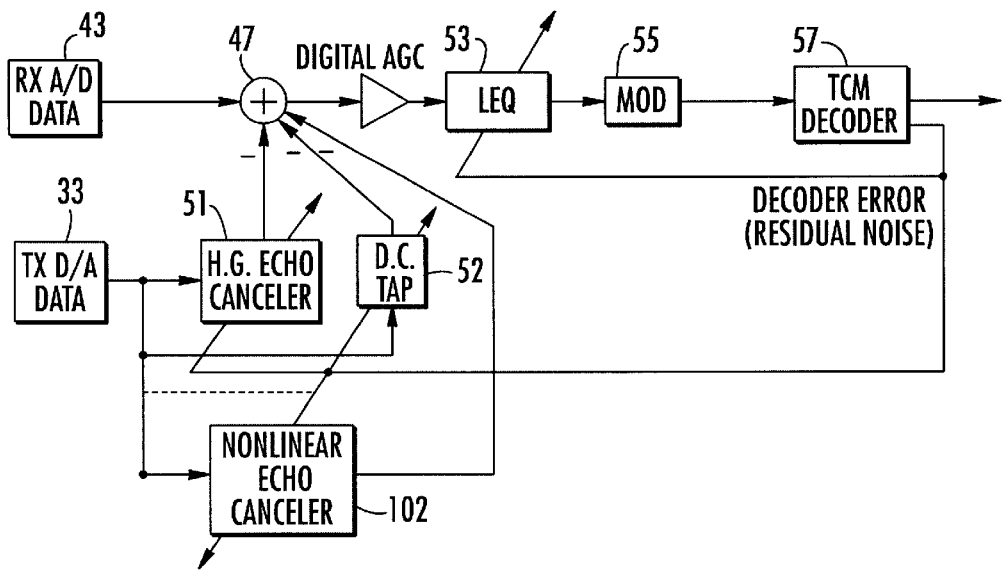
FIG. 15 shows a second embodiment of an echo cancellation architecture of the present invention, containing only a non-linear Volterra echo canceler, and a linear echo canceler with higher steady-state gain on selected taps.

The second echo cancellation architecture, shown in FIG. 15, contains only one additional device—the nonlinear (Volterra) echo canceler 102, the output of which is coupled to the subtraction unit 47, upstream of the LEQ 53. The second structure also employs a high-gain echo canceler 60, where a high-gain echo canceler is a conventional echo canceler 51 having selected taps adjusted with a higher steady-state gain (e.g., $2^{-12}$ instead of $2^{-16}$) to track variations in the echo path. The advantage of using this second architecture is that it has less complexity compared to that of FIG. 12. Since there is true echo cancellation, the echo response will not be smeared by the LEQ. The required number of taps for the nonlinear canceler 102 is smaller (less than 50 taps) in this architecture. A downside to the reduced complexity system of FIG. 15 is that its echo tracking performance is less than that of the canceler of FIG. 12. The LEQ 53 imparts a plurality of bauds delays. Therefore, the gain of the main linear echo canceler is limited by the stability problem associated with a delayed-feedback loop.

Figure 16:
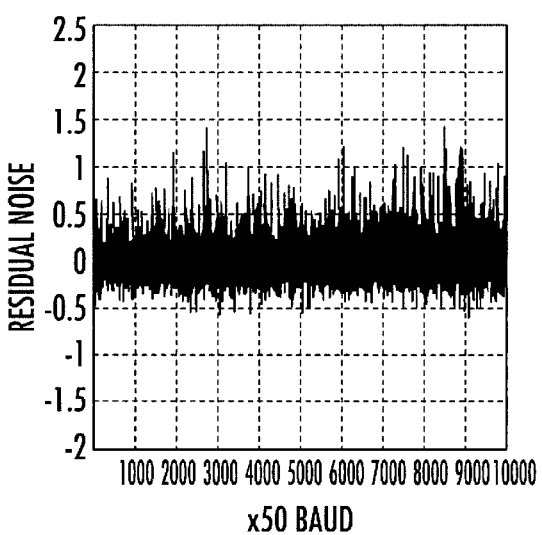
FIG. 16 graphically illustrates the performance of an echo cancellation architecture employing only the high gain echo canceler of the invention.
Figure 17:
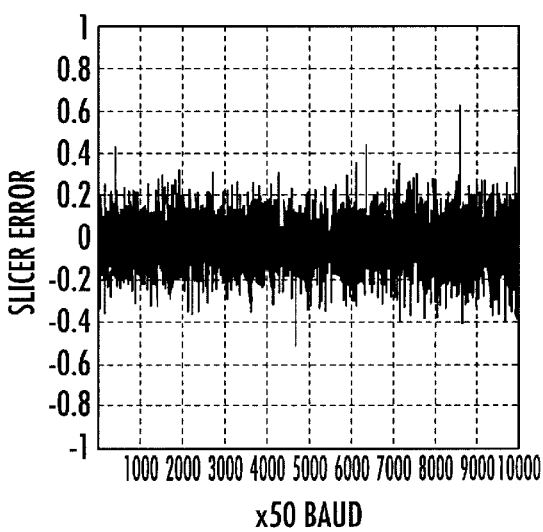
FIG. 17 graphically illustrates the performance of an echo cancellation architecture employing both the high gain echo canceler and the non-linear canceler of the invention.

Because the time constant of the residual echo variation is greater than 100 ms (1.0 k bauds) in all of the traces recorded from the test line, the LMS convergence speed of the high gain echo canceler 51 is able to track this noise variation. If the echo variation is faster than 10 ms, the architecture of FIG. 12 may be employed to increase the gain of the fast echo canceler 101 up to $2^{-8}$. FIGS. 16 and 17 graphically illustrate that the performance of the echo cancellation architecture of FIG. 15 is very similar to that obtained with the architecture of FIG. 12. With this reduced complexity structure, the average SNR improves to 37.9 dB, which provides 13 dB of margin in a loop with bad splices.

Figure 18:
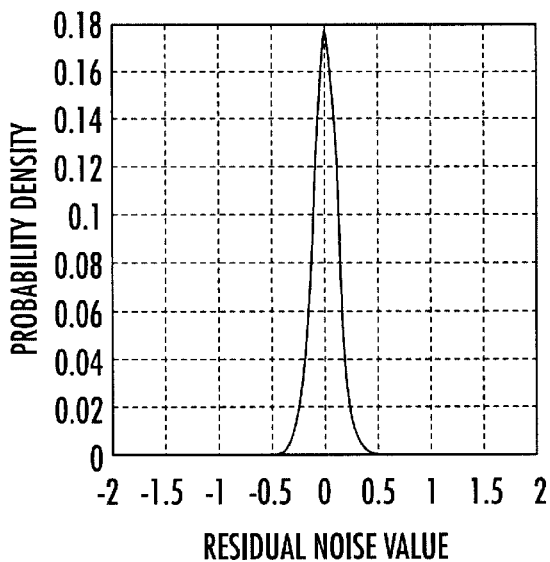
FIG. 18 shows the symmetrical distribution of the probability density function and the power spectral density of the residual noise of a transceiver incorporating the echo canceler architecture of FIG. 12.
Figure 19:
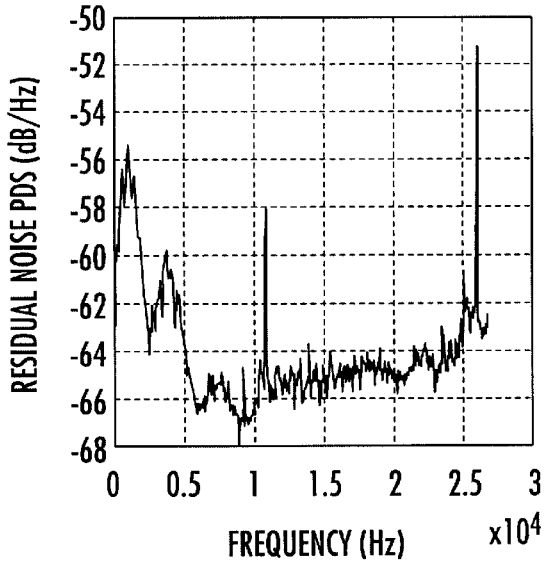
FIG. 19 shows the power spectral density associated with the operation of the echo canceler architecture of FIG. 12.

The probability density function (PDF) of the residual noise shown in FIG. 18 reveals that a transceiver incorporating the echo canceler architecture of FIG. 12 does not have an asymmetrical noise distribution. As a result, the bit error rate can be predicted using theoretical (Gaussian assumption) analysis, and it is unnecessary to use a correction factor to adjust the margin. Although, as shown in FIG. 19, the echo canceler architecture of FIG. 15 is unable to mitigate against the two tones of FIG. 5 located at 11.1 kHz and 25.4 kHz, the noise floor is significantly reduced compared with that shown in FIG. 9.

Figure 20:
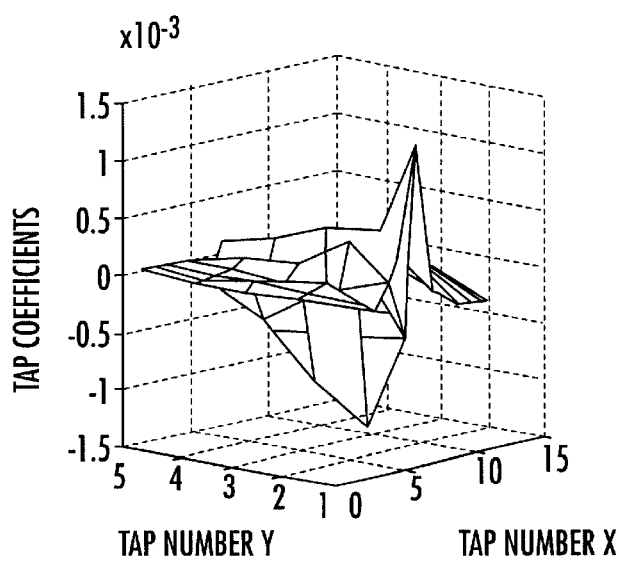
FIG. 20 shows a second order coefficient array of the converged nonlinear echo canceler of FIG. 15.

FIG. 20 shows the second order coefficients array of the converged nonlinear echo canceler of FIG. 15. The location (time delay) of its peak aligns with the largest peak of the main linear echo canceler. Therefore, the interference source is near the remote terminal (RT) unit.

As pointed out above, for purposes of providing a practical implementation of the architectures of FIGS. 12 and 15, the non-linear echo canceler 102 thereof may be realized as a truncated Volterra echo canceler. In order to facilitate an appreciation of the practical benefit of using such a Volterra-based echo canceler, the fundamental theory of a Volterra nonlinear architecture, which is effectively a relatively simple extension of a linear filter, will be briefly reviewed.

Although linear filters are useful in a large number of applications and relatively simple to implement, there are many practical situations which require nonlinear signal processing, such as in the case of saturation-type nonlinearity, which occurs in amplifier (drivers) and a transformer. One of the simplest nonlinear models is the polynomial nonlinearity, and attention may be directed to an article by V. John Mathews, entitled "Adaptive Polynomial Filters", IEEE Signal Processing Magazine, 1991, for a description of nonlinear modeling. The Volterra series expansion is one class of the polynomial nonlinearity. It is often used in adaptive nonlinear filtering, because a Volterra series is capable of reasonably accurately modeling a large class of real-world nonlinear systems. Moreover, as noted above, it can also be easily adapted by conventional LMS or RLS algorithms. In effect, the Volterra series expansion may be considered as a Taylor series expansion 'with memory'.

Figure 21:
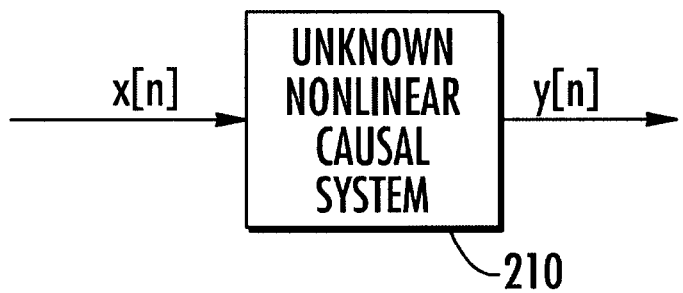
FIG. 21 diagrammatically illustrates an unknown causal nonlinear system having respective input and output signals $x[n]$ and $y[n]$.

If x[n] and y[n] represent respective input and output signals of an unknown causal nonlinear system 210, diagrammatically illustrated in FIG. 21, then the Volterra series expansion for y[n] using x[n] may be given by the following equation (1) as:

$$y[n] = h_o + \sum_{m_1=0}^{\infty} h_1[m_1] \times [n - m_1] +$$

$$\sum_{m_1=0}^{\infty} \sum_{m_2=0}^{\infty} h_2[m_1, m_2] \times [n - m_1] \times [n - m_2] +$$

$$\sum_{m_1=0}^{\infty} \sum_{m_2=0}^{\infty} \sum_{m_3=0}^{\infty} h_3[m_1, m_2, m_3] \times [n - m_1] \times [n - m_2] \times [n - m_3] +$$

$$\sum_{m_1=0}^{\infty} \sum_{m_2=0}^{\infty} \cdots$$

$$\sum_{m_p=0}^{\infty} h_p[m_1, m_2 \ldots m_p] \times [n - m_1] \times [n - m_2] \ldots \times [n - m_p] + \ldots$$

where: $h_o$ is the DC component, $h_1$ is the linear part of the Volterra series and the p-th dimensional coefficient array $h_p$ is known as the p-th order Volterra kernel of the system.

Since an infinite series expansion as in equation (1) is not particularly useful in a practical filtering application, the Volterra series is reduced or truncated to an appropriate size N that fits the real dimension of the system. This truncation of equation (1) is set forth in equation (2) as follows:

$$y[n] = h_o + \sum_{m_1=0}^{N-1} h_1[m_1] \times [n - m_1] \mathrm{DC} + \sum_{m_1=0}^{N-1} \sum_{m_2=0}^{N-1} h_2[m_1, m_2] \times [n - m_1] \times [n - m_2] +$$

$$\sum_{m_1=0}^{N-1} \sum_{m_2=0}^{N-1} \sum_{m_3=0}^{N-1} h_3[m_1, m_2, m_3] \times [n - m_1] \times [n - m_2] \times [n - m_3] +$$

$$\sum_{m_1=0}^{N-1} \sum_{m_2=0}^{N-1} \cdots \sum_{m_p=0}^{N-1} h_p[m_1, m_2, \ldots, m_p] \times [n - m_1] \times [n - m_2] \ldots \times [n - m_p] + \ldots$$

From the complexity of the equation (2), it can be seen that the truncated Volterra series model is most useful in applications where N (the number of taps in each delay lines) and P (the order of the series) are relatively small. It may be noted that there are $O(N^P)$ coefficients in this polynomial. Even in the case of moderately large values for N and P, the cost of implementation can be relatively large. As a result, most practical applications of systems that employ a Volterra series use only the lower-order model. Typically, second and third order models are most widely used for solving saturation-type of nonlinear systems.

Figure 22:
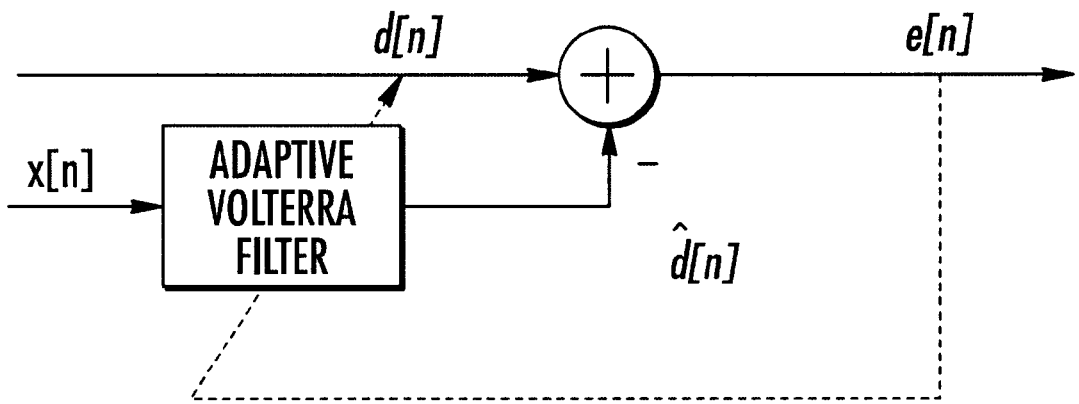
FIG. 22 diagrammatically illustrates an adaptive Volterra non-linear filter for system identification or signal cancellation.

As diagrammatically illustrated in FIG. 22, a truncated Volterra model can be used in an adaptive filter system. For purposes of providing a non-limiting, relatively simple example of a filter model, a second order truncated Volterra series may be realized as set forth in equation (3).

$$a[n] = \tag{3}$$

$$\sum_{m_1}^{N-1} h_1[m_1] \times [n - m_1] + \sum_{m_1=0}^{N-1} \sum_{m_2=0}^{N-1} h_2[m_1, m_2] \times [n - m_1] \times [n - m_2]$$

Without any loss of generality, the Volterra kernels may be assumed to be symmetric, i.e., $h_2[m_1, m_2] = h_2[m_2, m_1]$. Therefore, there are a total of $N(N+1)/2$ unique coefficients for a second order Volterra model. These filter coefficients are updated iteratively, so that some convex function of the error signal e[n] is minimized, as shown in equation (4).

$$e[n] = d[n] - \hat{d}[n] \tag{4}$$

Derivation of adaptive Volterra filters is relatively straightforward, since the error signal e[n] can be represented as a linear combination of the input signal times the coefficients. The LMS adaptive filter update using a steepest decent algorithm may be employed for both linear and nonlinear coefficients. The update equation of a second order Volterra filter may be represented in equations (5) and (6) as:

$$h_1[m_1; n+1] = h_1[m_1; n] + \mu_1 e[n - m_1] \tag{5}$$

$$h_2[m_1, m_2; n+1] = h_2[m_1, m_2; n] + \mu_2 e[n] x[n - m_1] x[n - m_2] \tag{6}$$

where $\mu_1$, $\mu_2$ are the gains that control the speed of convergence and the steady-state mean squared error of the adaptive filter. Update equation (6) can be extended to the p-th order coefficients. If implementation cost is a concern, the "sign update" algorithm may be used. It should be understood that the invention is not limited to this or any other particular adaptation algorithm. Other, more elaborate adaptation algorithms, such as normalized LMS and RLS algorithms (which have a faster convergence rate at a cost of higher complexity), may be employed with a Volterra series.

Figure 23:
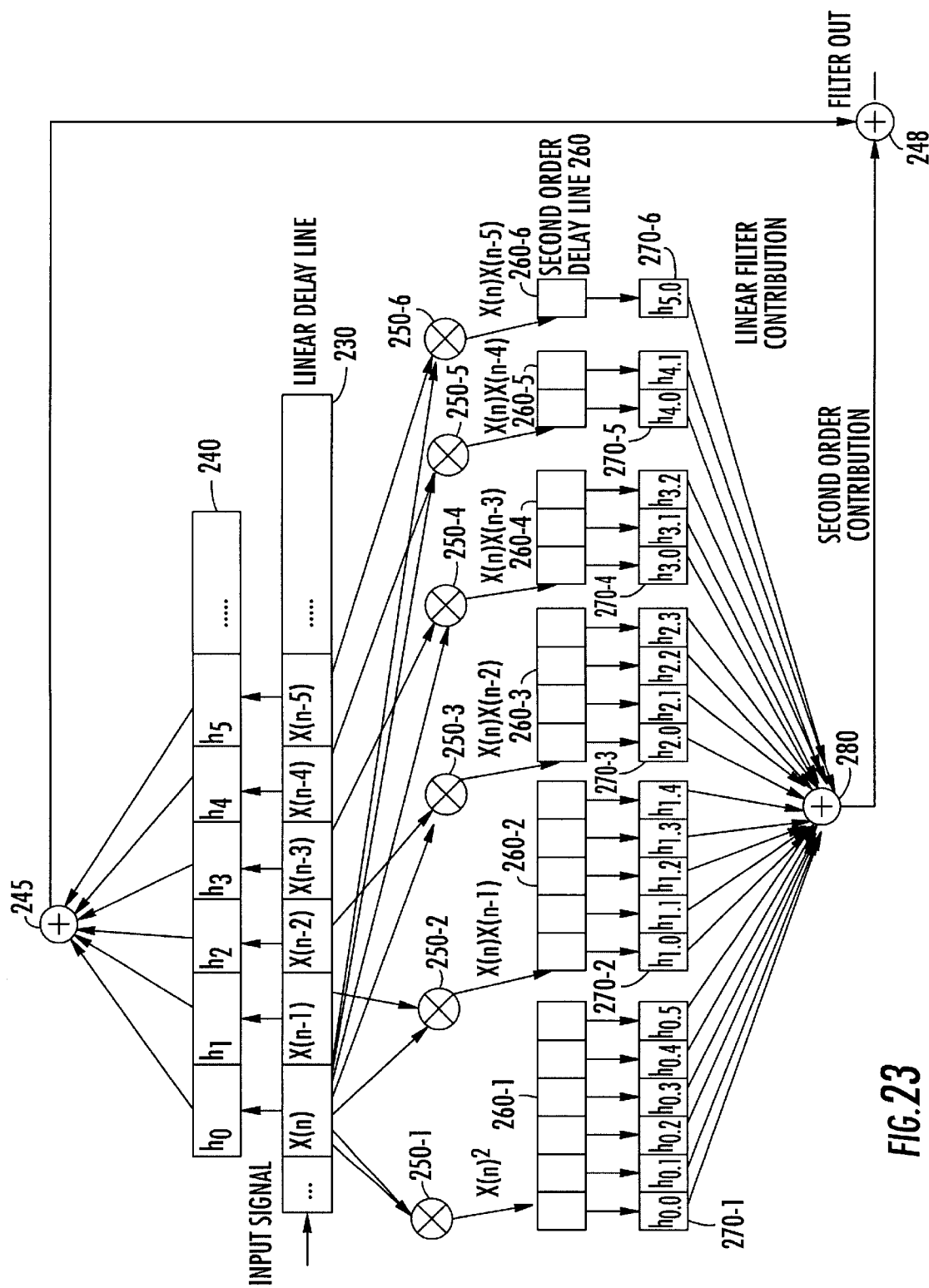
FIG. 23 diagrammatically illustrates a non-limiting embodiment of a second order Volterra nonlinear filter.

FIG. 23 diagrammatically illustrates a non-limiting embodiment of a second order Volterra nonlinear filter, where N=6 and P=2. As shown therein, the input signal x[n] to be filtered, is coupled to a multistage, linear delay line 230, successive stages $230_n$, . . . , $230_{n-5}$ of which are coupled to respective stages 240-$h_0$, . . . , 240-$h_5$ of a coefficient register 240. These values are summed in adder 245 and supplied as a linear filter contribution to an adder 248. The contents of the linear delay line 230 are selectively coupled to multipliers 250-1, . . . , 250-6, which output the respective products: $X(n)^2$; $X(n)X(n-1)$; $X(n)X(n-2)$; $X(n)X(n-3)$; $X(n)X(n-4)$; $X(n)X(n-5)$ to stages 260-1, . . . , 260-6 of a second order delay line 260. The contents of the respective stages 260-1, . . . , 260-6 of second order delay line 260 are stored in coefficient registers 270-1, . . . , 270-6, and summed in adder 280 as the second order contribution. The output of adder 280 is summed with the linear filter contribution to adder 248, which outputs the filtered output signal y[n].

Compared with a linear adaptive filter, the full-expansion of the second order Volterra nonlinear filter requires N additional multipliers, N additional delay lines, and (N+1) N/2 additional coefficients. For example, in the implementation of FIG. 23, six delay line stages $230_n$, . . . , $230_{n-5}$, six additional multipliers 250-1, . . . , 250-6, and fifteen additional coefficients (taps) stored in coefficient registers 270-1, 270-6 are required, making the filter relatively costly to implement. As a consequence, a computer simulation was conducted to determine whether the Volterra series may be further truncated, in order to derive a practical filter that is a reasonable tradeoff between complexity and performance. For purposes of a practical application, the computer simulation data characterizing the bad line splice, referenced above, was employed.

The first purpose of truncating the Volterra series is to reduce the size of the expansion. For an ideal line without a bad splice, the average SNR is a 41.9 dB. The average SNR reduced to 27 dB when the bad splices are present in the loop. It should be noted that this average value of SNR is slightly skewed since the distribution of slicer error is non-Gaussian. When a high gain echo canceler, such as that shown at 51 in FIG. 15, described above, is employed, the average SNR improves to 31.9 dB.

Therefore, the high-gain linear canceler solves only half of the problem. Using a second order Volterra nonlinear echo canceler, with N set to a value of 10, the average SNR can be improved to 37.9 dB.

Figures 24, 25:
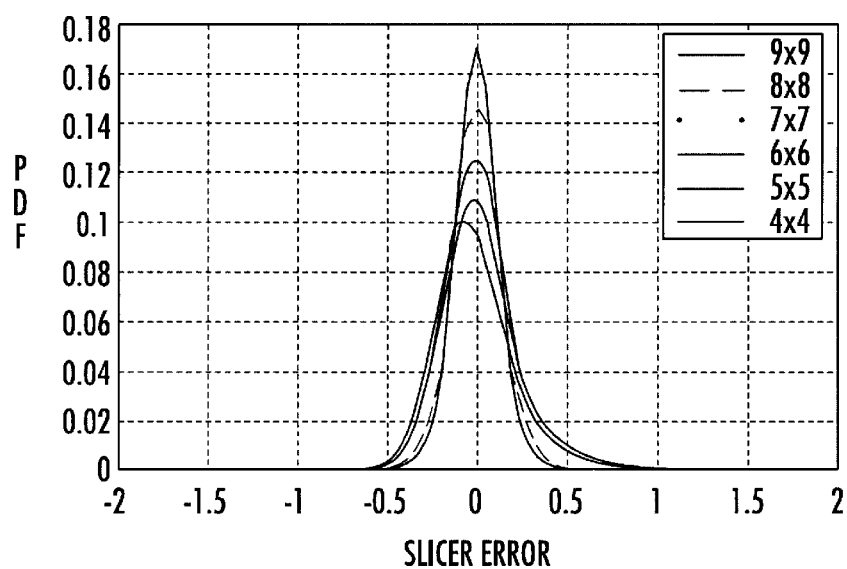
FIG. 24 contains a Table 1, showing tradeoff between the size of Volterra expansion and performance.
FIG. 25 shows a normalized slicer distribution for different sizes of a second order nonlinear echo canceler.

Table 1, shown in FIG. 24, shows the tradeoff between the size of Volterra expansion and performance. The complexity of the second order Volterra nonlinear canceler is $O(N^2)$. The distribution adjustment is caused by the noise PDF being non-Gaussian, as calculated using the peak-to-rms ratio of the slicer error relative to a normal Gaussian noise within the measurement period, referenced above.

FIG. 25 shows the normalized slicer error distribution for different sizes of a second order nonlinear canceler. The plotted results indicate that an 8×8 second order coefficient array provides a relatively reasonable tradeoff point. However, its complexity is increased as it requires eight additional multipliers and eight additional delay lines. The complexity of the filter architecture can be further reduced by using the prior knowledge of the coefficient array distribution to allocate taps. Since the echo canceler can be simulated using a relatively large second order Volterra array, the ideal weighting coefficient distribution is known. Although this weight distribution represents only the non-linear property of the loop, it may be employed as a representation of other loops with bad splices. Using this assumption, the number of taps may be reduced even further.

For purposes of illustration, five non-limiting cases (I–V) may be considered as follows:

| | |
|---|---|
| 8 taps $x[n]^2$+8 taps $x[n]^3$; | Case I |
| 8 taps $x[n]^2$+8 taps $x[n]x[n-1]$+8 taps $x[n]^3$; | Case II |
| 8 taps $x[n]^2$+8 taps $x[n]x[n-1]$+4 taps $x[n]x[n-2]$ +8 taps $x[n]^3$; | Case III |
| 8 taps $x[n]^2$+8 taps $x[n]x[n-1]$+4 taps $x[n]x[n-2]$ +4 taps $x[n]x[n-3]$+8 taps $x[n]^3$; and | Case IV |
| Full (8×8) 36 taps 2nd order Volterra+8 taps $x[n]^3$. | Case V |

In each case, the third order term, $x[n]^3$, was introduced by due to the fact that the nonlinear component of an ill-conditioned transformer tends to generate third order harmonics. As a consequence, this third order term may potentially abate some nonlinear distortion caused by bad splices. Adaptation of the third order term is accomplished using the same LMS update. The results are tabulated in table 2, shown in FIG. 26. It may be noted that the truncated Volterra model (Case IV) has 0.4 dB lower performance than the full-expansion of Case V. On the other hand, the number of taps is reduced from 44 taps (36+8) to 32 taps (24+8). As a consequence, Case IV is a reasonable tradeoff point for a practical filter implementation.

Figures 26, 27:
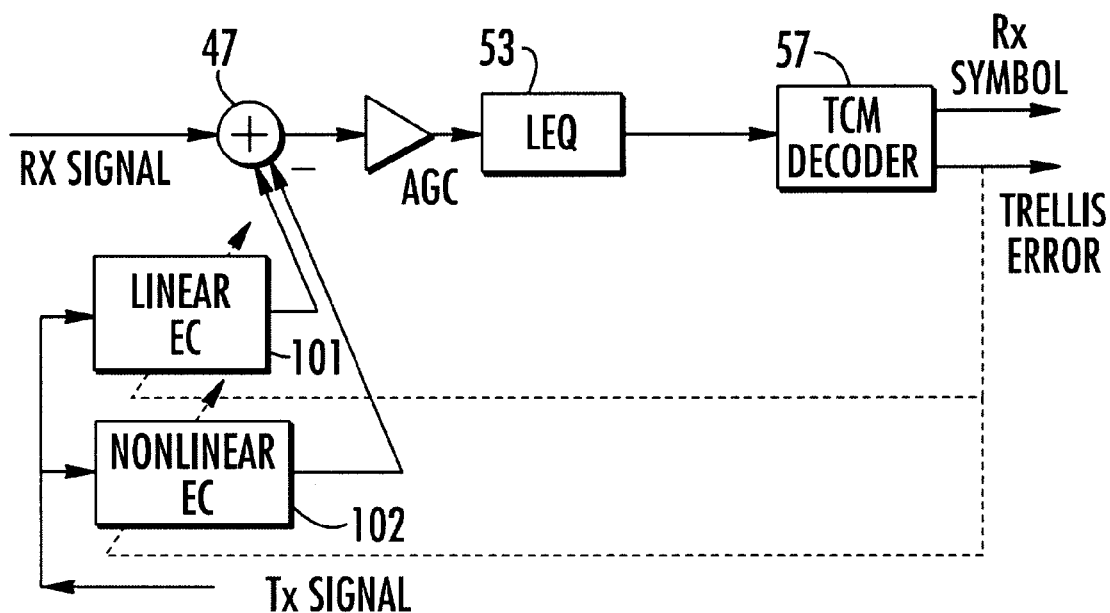
FIG. 26 contains a Table 2, showing the simulated performance of non-linear echo cancellation using five different Volterra models in FIG. 27.
FIG. 27 diagrammatically illustrates injecting a nonlinear Volterra filter upstream of the linear equalizer in the transceiver of FIG. 1.

Another important implementation issue is where to subtract the nonlinear component off the signal path–1) before, 2) after the LEQ, as described above. FIG. 27 diagrammatically illustrates injecting the nonlinear filter upstream of the LEQ, as in the embodiment of FIG. 15. Advantages of this implementation include: 1—sharing the linear echo canceler delay line to construct the nonlinear canceler delay lines, and 2—the nonlinear echo response will not be smeared (lengthened) by the LEQ. However, there are also several disadvantages.

First, since the trellis error will be at least eight bauds later than the transmitted signal, each of the first order and second order delay lines will need to be lengthened by eight taps. These extra delay elements are used to align the input signal with the update error. For example, case IV above requires five delay lines times eight, or forty 40 extra delay elements. Second, the error feedback goes through a delayed loop, so that the adaptation gain must be small in order to maintain stable operation. Third, the residual nonlinear distortion, after being canceled by the nonlinear canceler, is post-processed by an AGC element and LEQ, which implies that LMS adaptation may not achieve optimum performance.

Figures 28, 29:
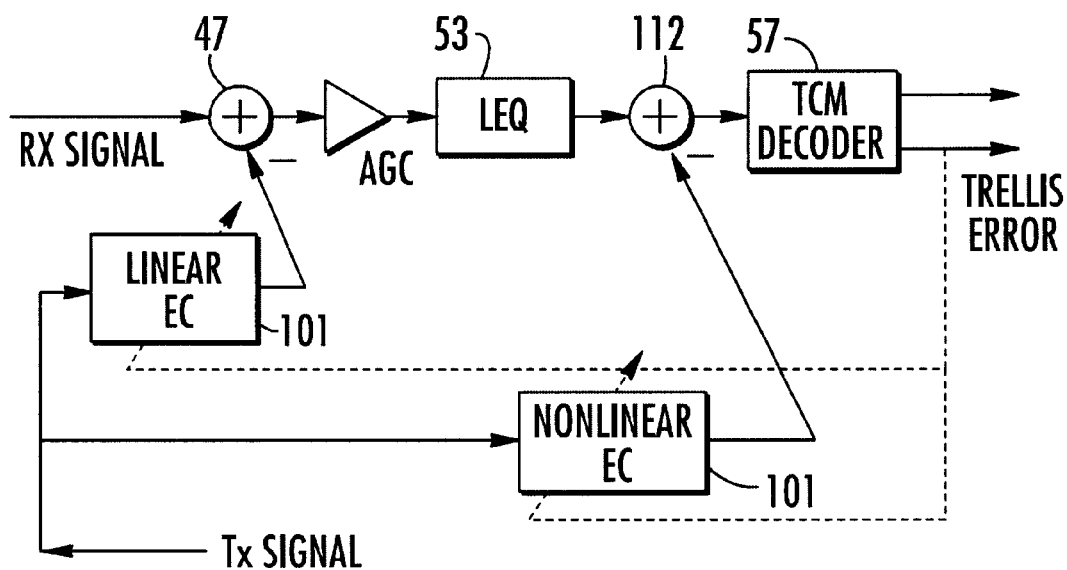
FIG. 28 diagrammatically illustrates injecting a nonlinear Volterra filter downstream of the linear equalizer in the transceiver of FIG. 1.
FIG. 29 contains a Table 3, showing simulated performance of the nonlinear echo cancellation using five different Volterra models in FIG. 30.

FIG. 28 diagrammatically illustrates injecting the nonlinear filter downstream of the LEQ, as in the embodiment of FIG. 12. There are three major advantages to this implementation. First, since the nonlinear echo canceler is downstream or after the LEQ, nonlinear residual echo will not be post-processed. Secondly, the alignment of the trellis error and the transmit signal requires only one additional delay line, i.e. 1×8 taps=8 extra delay elements. Third, the error feedback loop has a much shorter delay, so that a higher gain can be used for non-stationary non-linear distortion. A drawback to this implementation is that the nonlinear response will be processed by the LEQ prior to cancellation, which will potentially increase the required number of nonlinear taps. However, simulation results, tabulated in Table 3, shown in FIG. 29, reveal that performance is actually improved with the same number of taps in the test loop.

Figure 30:
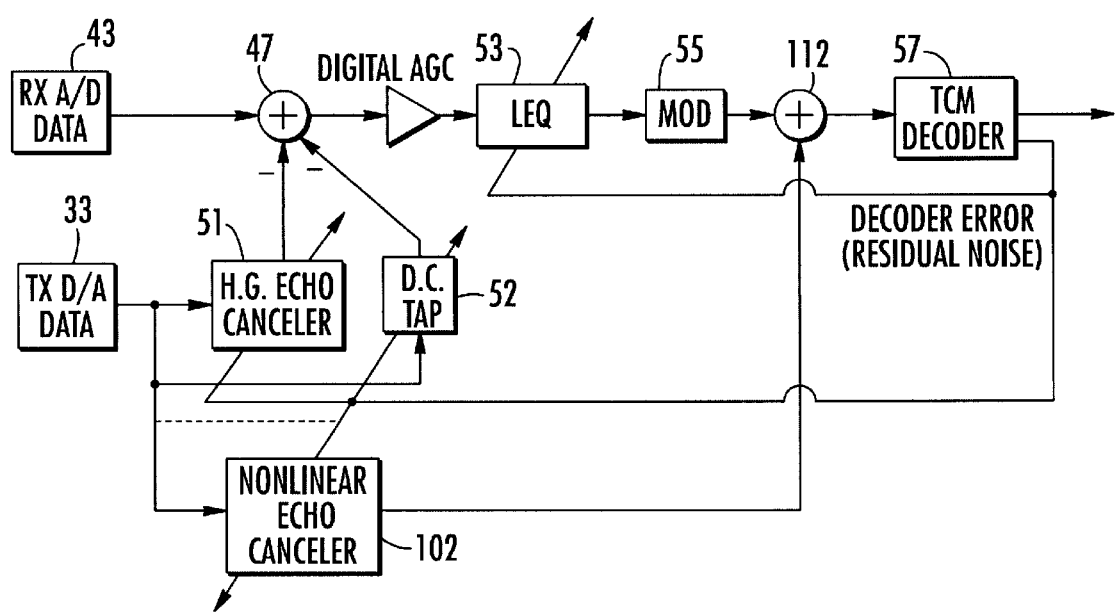
FIG. 30 shows a third embodiment of an echo cancellation architecture of the present invention having a high-gain echo canceler and a non-linear echo canceler.

A third embodiment of the present invention is shown diagrammatically in FIG. 30 and has high-gain echo canceler 51 coupled upstream of the linear equalizer 53, and non-linear echo canceler 102 coupled downstream of the linear equalizer 53 and between the modulo device 55 and decoder 57. The architecture of the third embodiment enjoys the benefits of the second embodiment, plus the additional benefits of fast tracking and low complexity. The performance of the third embodiment is similar to that of the second embodiment.

From a comparison of the performance results listed in Tables 2 and 3, it can be seen that the echo canceler architecture of FIGS. 12/28/30 is almost universally better than that of FIGS. 15/27 by more than 1 dB, supporting the case IV example (8 taps square term, three second order cross-terms and 8 taps cube term) nonlinear echo canceler structure injected in the data pump's signal flow path downstream of the LEQ 53.

As will be appreciated from the foregoing description, by using a Volterra-based structure that can rapidly re-adapt to a change in impulse response of the effective echo path, the echo canceler architecture of the present invention is able to effectively mitigate against non-linear perturbations (micro-interruptions), such as may be caused by a faulty splice in a telecommunications wireline, and thereby avoid unwanted disruptions of digital communication services.

The first embodiment of the invention employs a dual canceler structure containing a fast, linear echo canceler, and a truncated non-linear Volterra canceler coupled to an error cancellation location in the data signal flow path downstream of the data pump's linear equalizer. As noted previously, even though the use of a fast echo canceler alone can prevent errors in the transceiver's decoder, using a non-linear Volterra echo canceler in combination with the fast echo canceler provides a very high performance margin, and thereby ensures a very reliable is link even if it contains one or more faulty splices.

The second embodiment uses only the nonlinear Volterra echo canceler, whose output is coupled to an error cancellation location in the data signal flow path upstream of the data pump's linear equalizer. Also, the data pump's original echo canceler has an increased steady-state gain to track variations in the echo path. An advantage of the second embodiment is reduced complexity, and fewer taps for the nonlinear canceler. The third embodiment has an architecture similar to the first embodiment and has equivalent performance, but less complexity.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. An arrangement for transmitting digital communication signals over a two-wire transmission path comprising:
   a data transmission path having an encoder configured to output an encoded data signal for transmission over said two-wire transmission path;
   a data receiver path having a linear equalizer coupled in circuit with a decoder configured to decode a signal transmitted from a remote transceiver and received from said two-wire transmission path; and
   a first, non-linear echo canceler coupled downstream of said linear equalizer in said data receiver path and being operative to reduce from said data receiver path non-linear residual echo energy associated with said encoded data signal applied to said two-wire transmission path from said data transmission path.

2. An arrangement according to claim 1, wherein said non-linear echo canceler comprises a Volterra-based echo canceler.

3. An arrangement according to claim 1, wherein said non-linear echo canceler comprises a truncated Volterra-based echo canceler.

4. An arrangement according to claim 1, further including a second, linear echo canceler coupled in circuit with said data receiver path and being operative to reduce from said data receiver path energy associated with said encoded data signal applied to said two-wire transmission path from said data transmission path.

5. An arrangement according to claim 1, further including a linear echo canceler coupled in circuit with said data transmitter path and said data receiver path and being operative to mitigate against errors in the output of said decoder.

6. An arrangement according to claim 1, wherein said non-linear echo canceler is coupled in circuit with said data receiver downstream of said linear equalizer.

7. An arrangement according to claim 1, wherein said non-linear echo canceler is coupled in circuit with said data receiver upstream of said linear equalizer.

8. An arrangement according to claim 7, wherein said non-linear echo canceler comprises a Volterra-based echo canceler.

9. An arrangement according to claim 7, wherein said non-linear echo canceler comprises a truncated Volterra-based echo canceler.

10. An arrangement according to claim 9, wherein said truncated Volterra-based echo canceler comprises
    a multistage, linear delay line coupled to receive said encoded data signal applied to said two-wire transmission path as an input signal to be filtered,
    a first multistage coefficient store, having respective stages thereof coupled to respective stages of said multistage, linear delay line,
    a plurality of multipliers coupled to multiply contents of selected stages of said multistage, linear delay line, and generating respective products that are coupled to associated stages of a second order delay line,
    a second multistage coefficient store, having respective stages thereof coupled to respective stages of said second order delay line, and
    a summation unit which is operative to combine contents of stages of said first and second multistage coefficient stores.

11. An arrangement according to claim 9, further including a high speed linear echo canceler coupled in circuit with said data transmitter path and said data receiver path and being operative to mitigate against errors in the output of said decoder.

12. An arrangement according to claim 9, wherein said decoder comprises a Viterbi decoder.

13. A method of transmitting digital communication signals over a two-wire transmission path comprising the steps of:
    (a) providing a data transmission path that contains an encoder which is configured to output an encoded data signal for transmission over said two-wire transmission path, a data receiver path having a linear equalizer coupled in circuit with a decoder configured to decode a signal transmitted from a remote location and received from said two-wire transmission path, and a first, linear echo canceler coupled downstream of said linear equalizer in said data receiver path and being operative to reduce from said data receiver path energy associated with said encoded data signal applied to said two-wire transmission path from said data transmission path; and
    (b) mitigating against micro-interruptions, by coupling in circuit with said data receiver path a second, non-linear echo canceler that is operative to reduce from said data receiver path non-linear residual echo energy associated with said encoded data signal applied to said two-wire transmission path from said data transmission path.

14. A method according to claim 13, wherein said non-linear echo canceler comprises a Volterra-based echo canceler.

15. A method according to claim 13, wherein said non-linear echo canceler comprises a truncated Volterra-based echo canceler.

16. A method according to claim 15, wherein said truncated Volterra-based echo canceler comprises
    a multistage, linear delay line coupled to receive said encoded data signal applied to said two-wire transmission path as an input signal to be filtered,
    a first multistage coefficient store, having respective stages thereof coupled to respective stages of said multistage, linear delay line,
    a plurality of multipliers coupled to multiply contents of selected stages of said multistage, linear delay line, and generating respective products that are coupled to associated stages of a second order delay line, a second multistage coefficient store, having respective stages thereof coupled to respective stages of said second order delay line, and a summation unit which is operative to combine contents of stages of said first and second multistage coefficient stores.

17. A method according to claim 13, further including the step (c) of coupling a high speed linear echo canceler in circuit with said data transmitter path and said data receiver path, said high speed linear echo canceler being operative to mitigate against errors in the output of said decoder.

18. A method according to claim 13, wherein said non-linear echo canceler is coupled in circuit with said data receiver downstream of said linear equalizer.

19. A method according to claim 13, wherein said non-linear echo canceler is coupled in circuit with said data receiver upstream of said linear equalizer.

20. A method according to claim 13, wherein said non-linear echo canceler comprises a Volterra-based echo canceler.

21. A method according to claim 13, wherein said non-linear echo canceler comprises a truncated Volterra-based echo canceler.

22. A method according to claim 21, further including a high speed linear echo canceler coupled in circuit with said data transmitter path and said data receiver path and being operative to mitigate against errors in the output of said decoder.

23. A method according to claim 22, wherein said decoder comprises a Viterbi decoder.

24. A truncated Volterra-based echo canceler comprising:

a multistage, linear delay line coupled to receive an input signal to be filtered;

a first multistage coefficient store, having respective stages thereof coupled to respective stages of said multistage, linear delay line;

a plurality of multipliers coupled to multiply contents of selected stages of said multistage, linear delay line, and generating respective products that are coupled to associated stages of a second order delay line;

a second multistage coefficient store, having respective stages thereof coupled to respective stages of said second order delay line; and a summation unit which is operative to combine contents of stages of said first and second multistage coefficient stores.

* * * * *